Oct. 6, 1931.    E. HOPKINSON    1,826,214
FORM FOR RUBBER ARTICLES
Filed March 13, 1928

INVENTOR
Ernest Hopkinson
BY
ATTORNEY

Patented Oct. 6, 1931

1,826,214

UNITED STATES PATENT OFFICE

ERNEST HOPKINSON, OF NEW YORK, N. Y., ASSIGNOR TO MORGAN & WRIGHT, OF DETROIT, MICHIGAN, A CORPORATION OF MICHIGAN

FORM FOR RUBBER ARTICLES

Application filed March 13, 1928. Serial No. 261,218.

The present invention relates to a form for the manufacture of rubber articles directly from rubber latex or other aqueous dispersion of rubber, on which form the rubber is deposited directly in the shape desired. The invention provides a new and improved construction of a form of either the internal (mandrel) or external (mould) type. The invention further aims to provide such a form capable of withstanding the usage to which it would be subjected in commercial manufacture. At the same time the form herein described is well within a reasonable range of cost. The construction of the form is such that rubber articles may be manufactured directly thereon from latex or equivalent dispersion at a sufficiently rapid rate. And while a specific embodiment of an inner tube form is described herein, it is understood that the principles embodied in the construction may be applied to the manufacture of other articles.

An embodiment of the invention is illustrated in the accompanying drawings in which.

Figure 1:
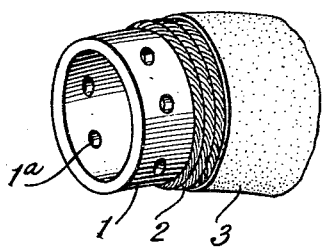
Fig. 1 is a perspective of a portion of a mandrel suitable for manufacturing inner tubes in curved nearly complete circular form, parts being broken away to more fully illustrate the construction.

The embodiment illustrated in Fig. 1 comprises a shape retaining support 1 helically wound with yarn, cables or cords 2, the latter being given after application a surfacing coat of a filtering composition.

Figure 2:
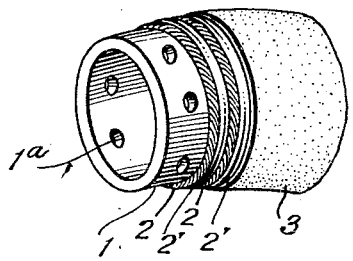
Figs. 2, 3 and 4 are similar views of modified constructions.

Fig. 2 shows the support 1 wrapped with alternate helical windings of cord 2 and wire 2', and surfaced with the filtering composition 3.

Figure 3:
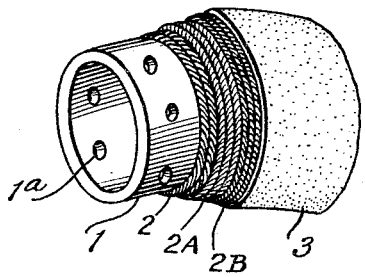

In Fig. 3 the support 1 is covered with a plurality of layers of yarn or cord windings 2, 2A and 2B, and an external coating of a filtering composition 3.

Figure 4:
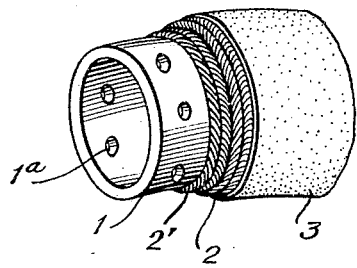

Fig. 4 shows the support 1 wound with wire 2' which may or may not be spaced, a winding of cord 2 and a surfacing coat or filtering composition 3.

The support 1 may be apertured at suitable distances as indicated by the numeral 1a, or the surface of the support may be knurled or grooved (not shown) or otherwise roughened to permit a lateral passage of fluid such as the aqueous content of the latex. Preferably the support is of metal, aluminum being a very satisfactory material for this purpose. The support, however, is not necessarily metallic but it should be shape-retaining, rigid enough to withstand collapse and denting, and further it should be comparatively light in weight, and unaffected by water.

In the figures of the drawings the fibrous wrapping has been illustrated as a yarn or cable or cord. This winding of fibrous material may be a loosely twisted or tightly twisted cord or cable, and it may be of any suitable diameter. If desired a plurality of windings of cords or yarns of varying diameters may be applied to the support. In the case of inner tube forms the support may be of a standard diameter, and the diameter required to meet tube specifications may be secured by winding a plurality of layers on the support. The cords, etc., may be wound at any convenient angle on the support. A group of cords or yarns laid parallel may be wound on the support, as one way of applying the windings. If desired to give additional strength, and to provide additional channels or grooves along which fluid may pass, the fibrous yarns or cords may contain a wire strand or strands. The surfacing coat of filtering composition is preferably one which may be painted over the windings of cord or filtered directly thereonto, or otherwise conveniently applied. The examples of suitable filtering compositions are water suspension of pulverulent materials such as kieselguhr, clay, diatomaceous earths of various sorts and equivalent materials. If desired the composition may be applied with a binder such as liquid phenol aldehyde condensation products, which may subsequently be hardened by heating at temperatures at which the fibrous material will not be damaged. For more detailed directions as to such filtering compositions and binders reference is made to pending application, Serial No. 237,185, filed December 2, 1927. A very suitable filtering composition is what is known in the trade as clay slip containing celite, as this is inexpensive, easy to apply, and is an excellent material for the purpose intended. Sufficient of the filtering composition is applied over the windings of yarn to give a smooth, continuous coating through which the ridges of the winding do not show. The surface may be buffed or sandpapered or otherwise brought to the requisite condition of smoothness.

Rubber articles may be built up by placing the form of the present invention in contact with a body of a dispersion such as rubber latex, and the solid content such as rubber therein allowed to filter on to the form until the desired thickness is obtained, when the form may be removed, the rubber coating dried, vulcanized, removed from the form and further processed if necessary to its complete and final shape.

While in the drawings and foregoing description the invention has been illustrated with a form of the internal or mandrel type, it is understood that the same principle may be applied to an external mold, thus to make a rubber article which does not require that its ends or other parts be joined, for example, an inner tube mold of the external type permits the manufacture of a jointless tube. In addition to the several embodiments described and illustrated, other combinations and associations of the windings of yarn or cord or cable with or without wire strands or windings may be made without departing from the principle of the invention. If desired, the forms herein described may have as the support a conductor of electricity, or the supports may be suitably treated so that they will act as conductors, thereby to permit the use of an electric current in the deposition of the rubber on the form. The supporting member may also be fitted so that a vacuum may be applied or so that a differential or pressure may be set up between the interior and exterior portions of the form. In the case of inner tube mandrels, the form may be masked or otherwise constructed so that tapered or skived ends may be formed simultaneously with the deposition of the rubber. It is therefore understood that all such changes and modifications which come within the principles underlying the invention, are intended to be comprehended in the accompanying claims, to which reference should be made for an understanding of the scope of the invention.

Having thus described my invention what I claim and desire to protect by Letters Patent is:

1. A form for the manufacture of inner tubes from rubber dispersions, which comprises an apertured metallic support, wrappings of cords overlying the support, and a relatively smooth surfacing of clay slip overlying the cords, said cords being alternated with strands of wire.

2. A device for use in the manufacture of rubber articles from a dispersion of rubber which comprises an apertured support, cord and wire arranged on the surface of the support so as to facilitate the flow of the continuous phase to the apertures, and filtering composition overlying the cord and adapted to effect the separation of the solid constituents of the dispersion.

3. A device for use in the manufacture of rubber articles from a dispersion of rubber which comprises an apertured support, layers of wrapped cord and wrapped wire arranged on the surface of the support, so as to facilitate the flow of the continuous phase of the dispersion to the apertures, and a layer of filtering composition overlying the cords and wire.

Signed at New York, county and State of New York, this 10th day of March, 1928.

ERNEST HOPKINSON.